United States Patent

Yamaguchi et al.

[11] Patent Number: 5,777,800
[45] Date of Patent: Jul. 7, 1998

[54] ZOOM LENS

[75] Inventors: Susumu Yamaguchi; Nobuyoshi Mori, both of Hachioji, Japan

[73] Assignee: Konica Corporation, Japan

[21] Appl. No.: 717,813

[22] Filed: Sep. 24, 1996

[30] Foreign Application Priority Data

Sep. 28, 1995 [JP] Japan .................................. 7-251171

[51] Int. Cl.$^6$ ........................................... G02B 15/14
[52] U.S. Cl. .................................. 359/692; 359/689
[58] Field of Search ............................... 359/689, 691, 359/692, 716, 717, 748, 753, 784, 786, 787, 788, 793, 795, 646, 676, 693, 746, 765, 688

[56] References Cited

U.S. PATENT DOCUMENTS

| | | | |
|---|---|---|---|
| 4,818,081 | 4/1989 | Ito ............................................ | 359/692 |
| 4,830,476 | 5/1989 | Aoki .......................................... | 359/692 |
| 5,179,473 | 1/1993 | Yano et al. ................................ | 359/691 |
| 5,278,699 | 1/1994 | Ito et al. .................................... | 359/692 |
| 5,280,390 | 1/1994 | Ito ............................................ | 359/691 |
| 5,309,285 | 5/1994 | Ito ............................................ | 359/691 |
| 5,633,760 | 5/1997 | Shibayama .............................. | 359/689 |
| 5,646,787 | 7/1997 | Kamo ...................................... | 359/689 |

FOREIGN PATENT DOCUMENTS

| | | |
|---|---|---|
| 4445775 | 6/1995 | Germany. |
| 2266972 | 11/1993 | United Kingdom. |
| WO9312450 | 6/1993 | WIPO. |

OTHER PUBLICATIONS

European Search Report EP 96 11 5381 with Annex Patent Abstracts of Japan Publication #06347696, dated 22 Dec. 1994 (one page).

Patent Abstracts of Japan Publication #06130298, dated 13 May 1994 (one page).

*Primary Examiner*—Frank G. Font
*Assistant Examiner*—Michael P. Stafira
*Attorney, Agent, or Firm*—Jordan B. Bierman; Bierman, Muserlian and Lucas

[57] ABSTRACT

A zoom lens includes, in the order named from an object side, a first lens group having a positive refracting power and a second lens group having a negative refracting power, in which magnification change is conducted by changing a distance between said first and second lens groups. The first lens group has, in the order named from the object side, a 1a lens component having a negative refracting power, including a 1-1 lens having a negative refracting power and a 1-2 lens made of a plastic material, at least one surface of which is an aspherical surface, and a 1b lens component having a positive refracting power. The second lens group has, in the order named from the object side, a 2-1 lens having a positive refracting power made of a plastic material, at least one surface of which is an aspherical surface, and a 2-2 lens having a negative refracting power. The zoom lens satisfies the following conditional expression.

$$2.5 < f_T/f_W$$

$$3.0 < f_T/f_1 < 5.0$$

where $f_W$ represents a focal length at a wide-angle end position of an entire system of the zoom lens, $f_T$ represents a focal length at a telephoto end position of the entire system of the zoom lens, and $f_1$ represents a focal length of the first lens group.

15 Claims, 9 Drawing Sheets

W

F3.7

— d LINE
--- g LINE

-1.0   1.0
SPHERICAL
ABERRATION

2ω=56.1°

— ΔS
--- ΔM

-1.0   1.0
ASTIGMATISM

2ω=56.1°

-5.0(%)   5.0(%)
DISTORTION

M

F7.2

— d LINE
--- g LINE

-1.0   1.0
SPHERICAL
ABERRATION

2ω=31.3°

— ΔS
--- ΔM

-1.0   1.0
ASTIGMATISM

2ω=31.3°

-5.0(%)   5.0(%)
DISTORTION

T

F10.1

— d LINE
--- g LINE

-1.0   1.0
SPHERICAL
ABERRATION

2ω=22.8°

— ΔS
--- ΔM

-1.0   1.0
ASTIGMATISM

2ω=22.8°

-5.0(%)   5.0(%)
DISTORTION

FIG. 3(a)-1
W
FIG. 3(a)-2
FIG. 3(a)-3
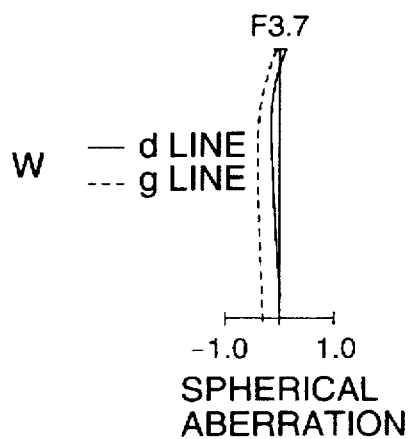
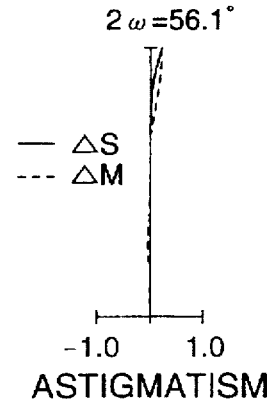
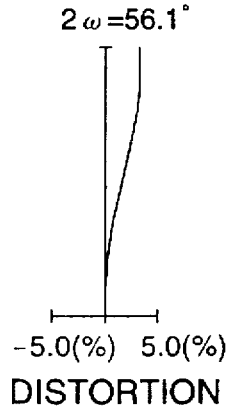
SPHERICAL ABERRATION | ASTIGMATISM | DISTORTION
FIG. 3(b)-1
M
FIG. 3(b)-2
FIG. 3(b)-3
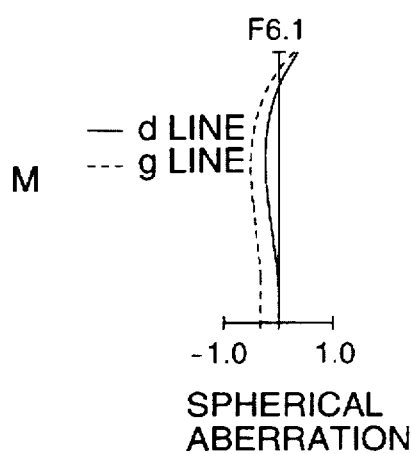
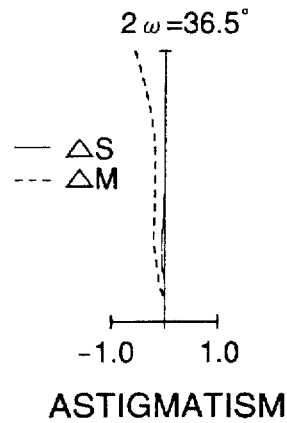
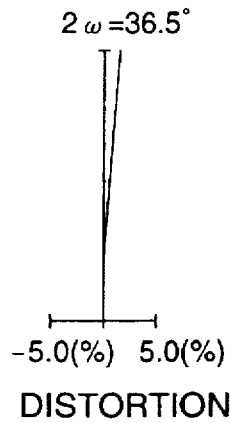
SPHERICAL ABERRATION | ASTIGMATISM | DISTORTION
FIG. 3(c)-1
T
FIG. 3(c)-2
FIG. 3(c)-3
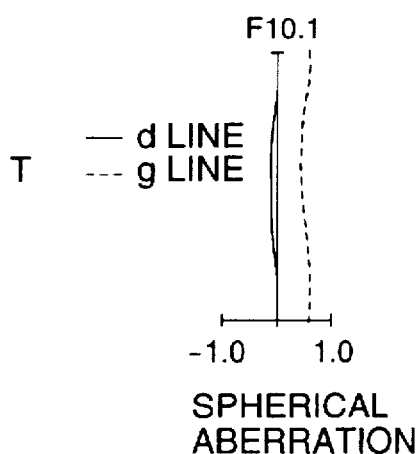
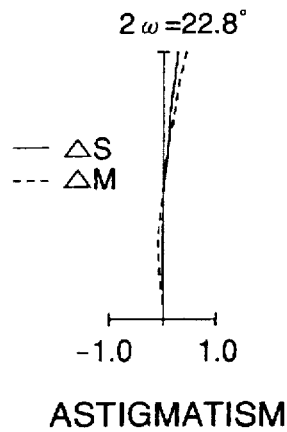
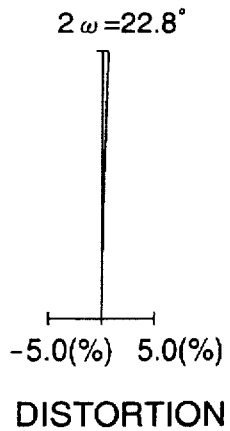
SPHERICAL ABERRATION | ASTIGMATISM | DISTORTION W
F3.7
— d LINE
--- g LINE
-1.0   1.0
SPHERICAL ABERRATION $2\omega = 56.3°$
— ΔS
--- ΔM
-1.0   1.0
ASTIGMATISM $2\omega = 56.3°$
-5.0(%)   5.0(%)
DISTORTION M
F6.1
— d LINE
--- g LINE
-1.0   1.0
SPHERICAL ABERRATION $2\omega = 36.9°$
— ΔS
--- ΔM
-1.0   1.0
ASTIGMATISM $2\omega = 36.9°$
-5.0(%)   5.0(%)
DISTORTION T
F10.1
— d LINE
--- g LINE
-1.0   1.0
SPHERICAL ABERRATION $2\omega = 22.9°$
— ΔS
--- ΔM
-1.0   1.0
ASTIGMATISM $2\omega = 22.9°$
-5.0(%)   5.0(%)
DISTORTION

W
SPHERICAL ABERRATION

ASTIGMATISM

DISTORTION

M
SPHERICAL ABERRATION

ASTIGMATISM

DISTORTION

T
SPHERICAL ABERRATION

ASTIGMATISM

DISTORTION

W, F3.5, d LINE / g LINE

SPHERICAL ABERRATION $2\omega=56.8°$, △S / △M

ASTIGMATISM $2\omega=56.8°$

DISTORTION

M, F6.3, d LINE / g LINE

SPHERICAL ABERRATION $2\omega=33.6°$, △S / △M

ASTIGMATISM $2\omega=33.6°$

DISTORTION

T, F11.7, d LINE / g LINE

SPHERICAL ABERRATION $2\omega=18.8°$, △S / △M

ASTIGMATISM $2\omega=18.8°$

DISTORTION

FIG. 8(a)-1
FIG. 8(a)-2
FIG. 8(a)-3
W
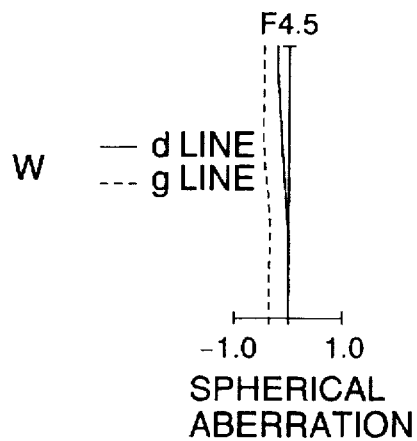
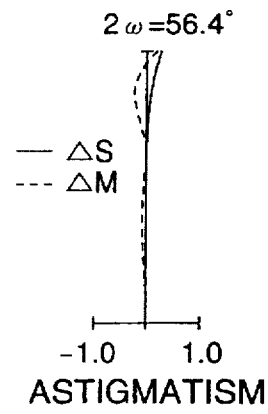
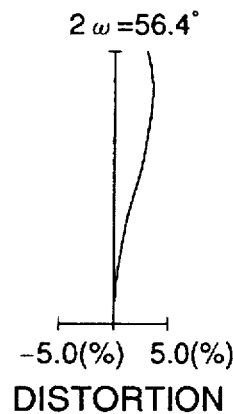
FIG. 8(b)-1
FIG. 8(b)-2
FIG. 8(b)-3
M
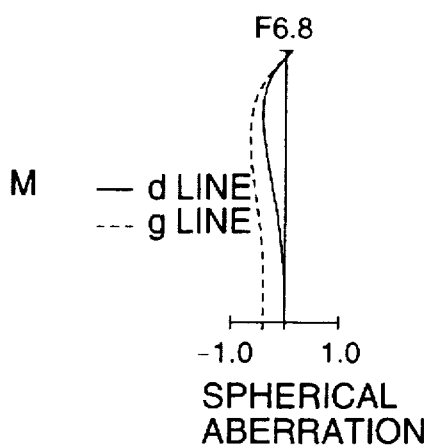
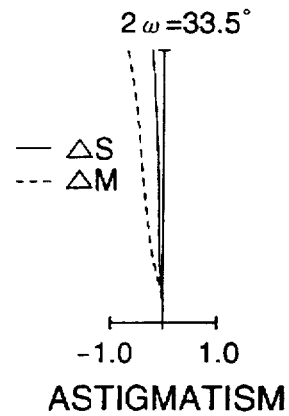
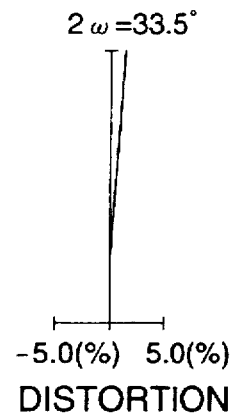
FIG. 8(c)-1
FIG. 8(c)-2
FIG. 8(c)-3
T
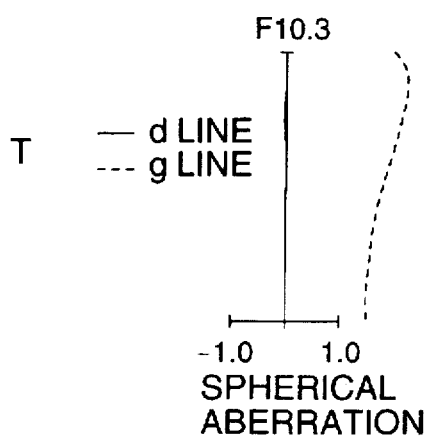
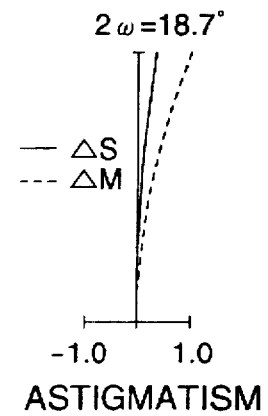
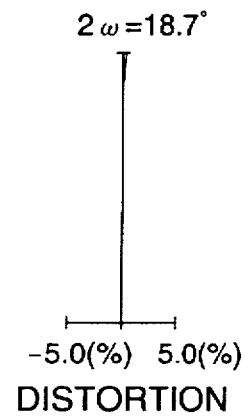

W

SPHERICAL ABERRATION

ASTIGMATISM

DISTORTION

M

SPHERICAL ABERRATION

ASTIGMATISM

DISTORTION

T

SPHERICAL ABERRATION

ASTIGMATISM

DISTORTION

ZOOM LENS

BACKGROUND OF THE INVENTION

The present invention relates to a zoom lens, and specifically to a zoom lens which is suitable for a photographic lens of a lens shutter camera, having a small number of lenses, a small overall size and a high variable magnification ratio.

Recently, down sizing, cost reduction, and a high variable magnification ratio are strongly required for a zoom lens of a lens shutter camera. In order to cope with such requirements, a zoom lens composed of 5–6 lens elements is proposed in Japanese Patent Publication Open to Public Inspection Nos. 130298/1994, and 181382/1995.

The zoom lens in these conventional examples is a 2-group composition zoom lens which is composed of the first lens group having a positive refracting power and the second lens group having a negative refracting power, which is the simplest composition in the various types of zoom lenses. This zoom lens is effective for down-sizing and cost reduction. In both conventional examples described above, 2 or 3 lenses having aspherical surfaces are formed of plastic material, and thereby the cost is decreased while lens performance is maintained.

However, in the conventional examples, because a lens formed of plastic material is arranged nearest the photographic object, special attention while operating the lens is needed so that the lens surface is not damaged.

SUMMARY OF THE INVENTION

An object of the present invention is to provide a zoom lens, which is composed of 2 groups formed of a first lens group having a positive refracting power and a second lens group having a negative refracting power, and which has a higher magnification ratio of 2.7–3.3 and has a smaller number of lens elements, with the intent of reducing the overall size and cost.

The above object is attained by one of the structures of the zoom lens having the following composition:

The first structure:

A zoom lens which is composed of a first lens group having a positive refracting power and a second lens group having a negative refracting power, sequentially from the object side, and achieves magnification by changing the interval between the two lens groups, the zoom lens being characterized in that: the first lens group is composed of a 1a lens group having a negative refracting power and a 1b lens group having a positive refracting power, sequentially from the object side; the 1a group being composed of a 1-1 lens having a negative refracting power and a 1-2 lens having an aspherical surface on at least one surface and formed of plastic material, sequentially from the object side; the second lens group being composed of a 2-1 lens, having a positive refracting power, which has an aspherical lens on at least one surface and is formed of plastic material, and a 2-2 lens having a negative refracting power, sequentially from the object side; and the zoom lens satisfies the following conditional expressions:

$$2.5 < f_T/f_W \quad (1)$$

$$3.0 < f_T/f_1 < 5.0 \quad (2)$$

where $f_W$: a focal length of the entire system at the wide-angle end position $f_T$: a focal length of the entire system at the telephoto end position $f_1$: a focal length of the first lens group Further, it is preferable to satisfy the following conditional expressions:

$$0.18 < f_1/f_{1a} < 0.40 \quad (3)$$

$$0.34 < D_1/f_W < 0.60 \quad (4)$$

$$v_{1-1} < 35 \quad (5)$$

Where $f_{1a}$: the focal length of the 1a lens group $D_1$: the lens thickness on the optical axis of the first lens group $v_{1-1}$: Abbe's number of the 1-1 lens Further, it is preferable to satisfy the following conditional expressions.

$$f_1/f_{1-2} < 0.1 \quad (6)$$

$$0.04 < |f_2|/f_{2-1} < 0.60 \quad (7)$$

Where $f_{1-2}$: the focal length of the 1-2 lens $f_{2-1}$: the focal length of the 2-1 lens $f_2$: the focal length of the second lens group The second structure:

A zoom lens which is composed of a first lens group having a positive refracting power and a second lens group having a negative refracting power, sequentially from the object side, and conducts magnification by changing the interval between the two lens groups, the zoom lens characterized in that: the first lens group is composed of not more than 3 lens elements, including the 1-1 lens having a negative refracting power nearest the object-side, and the 1-b lens having a positive refracting power nearest the image side; the second lens group is composed of the 2-1 lens having a positive refracting power and a convex surface facing the image side and the 2-2 lens having a negative refracting power, sequentially from the object-side; at least one surface of the 1-b lens being an aspherical surface; and the zoom lens satisfies the following conditional expressions:

$$2.5 < f_T/f_W \quad (1)$$

$$1.8 < F_W \cdot f_1/f_W < 3.0 \quad (8)$$

where $f_W$: the focal length of the entire system at the wide-angle end position $f_T$: the focal length of the entire system at the telephoto end position $F_W$: the F-number at the wide-angle end position $f_1$: the focal length of the first lens group Further, it is preferable that the first lens group is composed of a 1-1 lens having a negative refracting power, a 1-2 lens having an aspherical surface on at least one surface, and a 1-b lens, sequentially from the object-side.

The third structure:

A zoom lens which is composed of a first lens group having a positive refracting power and a second lens group having a negative refracting power, sequentially from an object-side, and conducts magnification by changing the interval between the two lens groups, the zoom lens characterized in that: the first lens group is composed of not more than 3 elements including the 1-1 lens having a negative refracting power nearest the object-side, and the 1-b lens having a positive refracting power nearest the image-side, sequentially from the object side; and the zoom lens satisfies the following conditional expressions:

$$2.5 < f_T/f_W \quad (1)$$

$$2\omega_T < 23 \quad (9)$$

$$0.005 < \delta f_{BT}/f_T < 0.020 \quad (10)$$

where $f_W$: the focal length of the entire system at the wide-angle end position $f_T$: the focal length of the entire system at the telephoto end position $\omega_T$: the half-field angle at the telephoto end position $\delta f_{BT}$: the longitudinal chromatic aberration of the g-line with respect to the d-line at a telephoto end position.

Further, it is preferable to satisfy the following conditional expressions:

$$2.8 < f_T/f_W$$

$$2\omega_T < 22$$

$$0.007 < \delta f_{BT}/f_T < 0.007$$

Further, it is preferable that the first lens group is composed of the 1-1 lens having a negative refracting power, the 1-2 lens having an aspherical surface on at lest a single surface, and the 1-b lens, sequentially from the object-side.

The fourth structure:

A zoom lens which is composed of the first lens group having a positive refracting power and the second lens group having a negative refracting power, sequentially from the object-side, and conducts magnification by changing the interval between the two lens groups, the zoom lens characterized in that: the first lens group is composed of not more than 3 elements including the 1-1 lens having a negative refracting power nearest the object-side, and the 1-b lens having a positive refracting power nearest the image-side, and the zoom lens satisfies the following conditional expressions:

$$2.8 < f_T/f_W \quad (11)$$

$$-6 < \delta f_{BT}/\delta f_{BW} < -2.4 \quad (12)$$

Further, it is preferable to satisfy the following conditional expressions:

$$3.2 < f_T/f_W < 3.5$$

$$-5.8 < \delta f_{BT}/\delta f_{BW} < -4$$

where $f_W$: the focal length of the entire system at the wide-angle end position $f_T$: the focal length of the entire system at the telephoto end position $\omega_T$: the half-field angle at the telephoto end position $\delta f_{BW}$: the longitudinal chromatic aberration of the g-line with respect to the d-line at the wide-angle end position.

$\delta f_{BT}$: the longitudinal chromatic aberration of the g-line with respect to the d-line at the telephoto end position.

Further, it is preferable to satisfy the following conditional expressions:

$$v_{1N} < 35 \quad (13)$$

$$v_{1P} > 50 \quad (14)$$

where $v_{1N}$: Abbe's number of the negative lens of the first lens group $v_{1P}$: Abbe's number of the positive lens of the first lens group Further, it is preferable that the second lens group be composed of the 2-1 lens, which has an aspherical surface on at least one surface and has a positive refracting power, and the 2-2 lens having a negative refracting power, sequentially from the object-side.

The fifth structure:

A zoom lens which is composed of the first lens group having a positive refracting power and the second lens group having a negative refracting power, sequentially from the object-side, and conducts magnification by changing the interval between the two lens groups, the zoom lens characterized in that:

the fist lens group is composed of not more than 3 elements, and the zoom lens satisfies the following conditional expressions.

$$0 < \delta f_{BT} \quad (15)$$

$$-3 \times (F_T/F_W) < \delta f_{BT}/\delta f_{BW} < -1.2 \times (F_T/F_W) \quad (16)$$

Further, it is preferable to satisfy the following conditional expressions:

$$-2.5 \times (F_T/F_W) < \delta f_{BT}/\delta f_{BW} < -1.5 \times (F_T/F_W)$$

where $F_W$: the F-number at the wide-angle end position $F_T$: the F-number at the telephoto end position $\delta f_{BW}$: the longitudinal chromatic aberration of the g-line with respect to the d-line at the wide-angle end position.

$\delta f_{BT}$: the longitudinal chromatic aberration of the g-line with respect to the d-line at the telephoto end position.

Further, the diameter of the aperture stop can be changed corresponding to the zoom position, and the zoom lens preferably satisfies the following conditional expressions:

$$0.5 \times (f_T/f_W) < F_T/F_W < f_T/f_W \quad (17)$$

where $F_W$: the F-number at the wide-angle end position $F_T$: the F-number at the telephoto end position $f_W$: the focal length of the entire system at the wide-angle end position $f_T$: the focal length of the entire system at the telephoto end position Further, it is more preferable that the first lens group be composed of not more than 3 lens elements including the 1-1 lens having a negative refracting power nearest the object-side, and the 1-b lens having a positive refracting power nearest the image-side; and that the second lens group be composed of the 2-1 lens, which has an aspherical surface on at least one surface and has a positive refracting power, and the 2-2 lens having a negative refracting power, sequentially from the object-side.

In the above-described first structure of the present invention, an aspherical lens made of plastic material is used to achieve cost reduction and reduction of overall size and weight.

In the first lens group, the 1-2 lens in the negative 1a group has an aspheric surface. When this aspheric surface is made as a divergent aspheric surface, astigmatism generated in the positive 1b group can be corrected. Further, this aspheric surface can also correct the spherical aberration.

Herein, in the composition of the 1 a lens group, the simplest composition is a single negative lens. However, under the assumption of the aspheric surface, it is not a desirable composition. The reason is that the plastic material is impractical for use because it is easily damaged when it is used for the lens nearest the object, in the case where a plastic aspherical lens is used. Further, when a glass aspherical lens is used, the production cost is increased because the production of the lens having the negative refracting power by glass-molding is difficult.

In the second lens group, because the height of the passing light is different on the optical axis and outside of the optical axis specifically within the rage of wide angle-side, the aberration on the optical axis can not be affected and the lateral aberration outside the optical axis can be satisfactorily corrected, when the aspheric surface is used. Further, when the distortion is caused to exist on the negative-side by the use of the aspheric surface, the increase of the positive distortion on the wide-angle end position can be prevented.

Although the second lens group has a negative refracting power as a whole, because molding is generally difficult for a large diameter lens having a negative refracting power, it is preferable to use plastic material for the lens having a positive refracting power, and therefore, a plastic material is used for the 2-1 lens.

The conditional expressions will be described as follows.

The conditional expression (1) is a basic condition of the zoom lens composition having a variable magnification ratio of not less than 2.5 times, which is generally called a high variable magnification ratio.

In conditional expression (2), the refracting power of the first lens group is regulated so that the aberration is satisfactorily corrected without destroying the compactness of the zoom lens having a high variable magnification ratio in the conditional expression (1).

When the refracting power of the first group exceeds the lower limit 3.0 and becomes smaller, then the entire lens length at the telephoto end position is larger, and down sizing of the zoom lens can not be attained. The reason for this is as follows. When it is assumed that the first group and the second group are respectively composed of a single thin lens, and the interval between the two groups is "e", then, the entire lens length L at the telephoto end position is given by $$L=e+f_T(1-e/f_1).$$

When, the refracting power of the first group exceeds the upper limit 5.0 and becomes greater, then, it is advantageous in reduction of the entire lens length, however, residual aberration in the first lens group becomes greater, and the magnification ratio of the second lens group also becomes larger, thereby the entire aberration correction becomes more difficult. Accordingly, the following condition is preferable.

$$3.4<f_T/f_1<5.0$$

The conditional expression (3) regulates the refracting power of the 1a group. When the negative refracting power of the 1a lens group exceeds the upper limit and becomes greater, the refracting power of the 1a lens group having negative refracting power in the first lens group, and the refracting power of the 1b lens group having positive refracting power in the first lens group become greater, and the eccentric sensitivity between both groups is increased and extreamly higher assembly accuracy is required, resulting in a corresponding increase of production cost. In a high variable magnification zoom lens, it is necessary to pay close attention to the eccentric sensitivity of the lens in the first lens group. When the negative refracting power of the 1a lens group exceeds the lower limit and becomes weaker, it is difficult to ensure the back focal length at the wide-angle end position, and the effect of correction of the lateral chromatic aberration generated in the negative second lens group becomes smaller.

Conditional expression (4), together with conditional expression (3), regulates the appropriate values of the axial thickness $D_1$ of the first lens group in order to decrease the overall size of the zoom lens, retaining excellent performance. When the axial thickness of the first lens group exceeds the upper limit of conditional expression (4), it becomes necessary to increase the diameter of the front lens in order to retain the relative illumination at the wide-angle end position, making it difficult to decrease the size of the zoom lens. When the axial thickness of the first lens group exceeds the lower limit, which is effective for a decrease of the size of the zoom lens, however the eccentric sensitivity in the first lens group is increased for the same reason as in conditional expression (3).

Conditional expression (5) relates to dispersion of the 1-1 lens, and is a conditional expression to cancel the lateral chromatic aberration generated in the second lens group. The upper limit is its boundary value.

In the present invention, plastic material is used for lenses having a small refracting power, and the aberration is corrected when the aspheric surface is applied onto lenses formed of the plastic material, and thereby, some of the disadvantages of plastic lenses, such as being sensitive to environmental changes, such as temperature or humidity, are compensated for.

The conditional expression (6) relates to the refracting power of the 1-2 lens formed of plastics, and is set to a small value in order to suppress variations of the image surface and the performance due to environmental changes, such as temperature. The following condition is more preferable.

$$f_1/f_{1-2}|<0.02$$

The conditional expression (7) relates to the refracting power of the 2-1 lens formed of plastics. When the positive refracting power exceeds the upper limit of the conditional expression and becomes larger, it is difficult to suppress variations of the image surface and the performance due to environmental changes such as temperature or similar factors. When the positive refracting power of the 2-1 lens exceeds the lower limit and becomes smaller, the offset effect of the spherical aberration and Petzval's sum with respect to the 2-2 lens having a negative refracting power become smaller. Then, the spherical aberration becomes excessive in the entire second lens group, and the negative Petzval's sum is also increased.

In the above-described second structure, when the 1-1 lens located nearest the object side in the first lens group has a negative refracting power, and the 1-b lens located nearest the image side has a positive refracting power, the second principal point of the first lens group can be arranged further toward the back, that is, near the second lens group-side, and can fully approach the first principal point of the second lens group at the telephoto end position. Accordingly, the lens system can have high variable-magnification properties without excessively increasing the refracting power of each lens group. Further, in combination with the negative second lens group, the lateral chromatic aberration and distortion at the wide-angle end position can be satisfactorily corrected. Further, when at least one surface of the 1b lens group is formed of the aspherical surface, the spherical aberration in the first lens group can be desirably corrected. Thereby, a highly variable magnification zoom lens, which satisfies the conditional expression (1), can be obtained when the first lens group is composed of not more than 3 lens elements.

When the refracting power of the first lens group becomes larger or $F_W$ is decreased exceeding the lower limit of 1.8 of the above-described conditional expression (8), the correction of the spherical aberration in the first lens group is hard to achieve.

Further, when the refracting power exceeds the upper limit of 3.0 and becomes smaller, the aberration can be fully corrected, however, the overall lens length at the telephoto end position becomes larger, for the same reason described in the explanation of the conditional expression (2).

Further, when the aspherical surface is used for the 1-2 lens of the first lens group, coma and astigmatism can also be easily corrected.

In the above-described third structure, when the 1-1 lens having a negative refracting power is arranged nearest the object-side of the first lens group, and the 1b lens having a positive refracting power is arranged nearest the image-side, in order to achieve high variable magnification, then, the lateral chromatic aberration generated in the negative 1-1 lens is increased with respect to oblique rays outside the optical axis by fully correcting the longitudinal chromatic aberration in the first lens group. Therefore, the longitudinal chromatic aberration of the first lens group can not be sufficiently corrected when the lens group is composed of no more than 3 lens elements. Or, the lens composition is changed and the correction of the longitudinal chromatic aberration is carried out by arranging the lens having the negative refracting power at a rear portion close to the 1b lens. However, in the latter method, the second principal position of the first lens group is not preferable, and it is difficult to attain the high variable magnification. In the former method, in order to fully remove the lateral chromatic aberration generated in the first lens group, the longitudinal chromatic aberration becomes too large, therefore, it is necessary to correct the lateral chromatic aberration generated in the first lens group by the second lens group. That is, the second lens group is caused to have a diverging chromatic aberration. By this method, insufficient effects are exerted on the wide-angle end position, and excessive effects are exerted on the telephoto end position, due to the position of the second lens group. Accordingly, the longitudinal chromatic aberration is insufficiently corrected at the wide-angle end position, and excessively corrected at the telephoto end position. By this correction method of the longitudinal chromatic aberration, the lateral chromatic aberration can be corrected almost within the range from the wide-angle end position to the telephoto end position.

When the upper limit of the conditional expression (9) is exceeded, the field angle of the lens at the telephoto end position becomes too large; the field angle at the wide-angle end position becomes too large in the highly variable magnification zoom lens, satisfying conditional expression (1); and the lateral chromatic aberration becomes too large at the wide-angle end position and can not be corrected with a lens composition, in which the first lens group is composed of not more than 3 lens elements, as in the present invention.

The conditional expression (10) relates to a correction method of the above-described chromatic aberration. When the upper limit of the conditional expression (10) is exceeded, the longitudinal chromatic aberration at the telephoto end position becomes too large, and the contrast is decreased. Reversely, when the lower limit is exceeded, the longitudinal chromatic aberration and the lateral chromatic aberration at the wide-angle end position become conspicuous, which is unpreferable.

As described above in the foregoing fourth structure, when the longitudinal chromatic aberration is insufficiently corrected at the wide-angle end position, that is, $\delta f_{BW} < 0$, and excessively corrected at the telephoto end position, that is, $\delta f_{BT} > 0$, then, the lateral chromatic aberration can be fully corrected by not more than 3 lens elements. In the higher variable-magnification zoom lens satisfying the conditional expression (11), when $\delta f_{BW}$ and $\delta f_{BT}$ are corrected so as to satisfy the conditional expression (12), the chromatic aberration from the wide-angle end position to the telephoto end position can be corrected with excellent balance.

When the upper limit of the conditional expression (12) is exceeded, the longitudinal chromatic aberration and the lateral chromatic aberration are conspicuous at the wide-angle end position, and when the lower limit is exceeded, the longitudinal chromatic aberration becomes too large at the telephoto end position.

Further, when the upper limit of the conditional expression (13) is exceeded, and the lower limit of the conditional expression (14) is exceeded toward the smaller side, the correction of the longitudinal chromatic aberration of the first lens group is too insufficient, which is undesirable.

In the above-described fifth structure, the effects on the image quality of the longitudinal chromatic aberration relates to the depth of focus, that is, to the F number of the lens. The reason is that the larger the F number is, the smaller the blur, due to the longitudinal chromatic aberration is.

When the amount of the blur is expressed by $\epsilon$, the $\epsilon$ is expressed by $\epsilon = \delta f_B / F$ with respect to, for example, the g-line. Herein, $\delta f_B$ is the longitudinal chromatic aberration of the g-line with respect to the d-line, and F is the F number. The F number and the longitudinal chromatic aberration may be determined so that the blur, due to the longitudinal chromatic aberration, becomes equal specifically at the wide-angle end position and the telephoto end position, however, the following additional points need to be considered.

When the first lens group is composed of not more than 3 lens elements and the correction of the longitudinal chromatic aberration is insufficient; and the second lens group is also corrected so that the correction is excessive at the telephoto end position, that is, so that the conditional expression (15) is satisfied, then, the lateral chromatic aberration is corrected with excellent balance between the wide-angle end position and the telephoto end position. In this case, the axial chromatic aberration is corrected insufficiently at the wide-angle end position, and the back focal length becomes longer as the wavelength changes from short wavelengths to longer wavelengths, in the visible range. On the other hand, the back focal length becomes shorter quickly from the shorter wavelength to the intermediate wavelength by an effect of the second lens group at the telephoto end position, and changes very slightly from the intermediate wavelength to the long wavelength. That is, the longitudinal chromatic aberration is small between the intermediate wavelength and the long wavelength.

That is, the longitudinal chromatic aberration in the entire visible range at the wide-angle end position is larger than $\delta f_{BW}$, and is almost equal to $\delta f_{BT}$ at the telephoto end position.

Considering the above description, the longitudinal chromatic aberrations $\delta f_{BW}$ and $\delta f_{BT}$, and F numbers $F_W$ and $F_T$ may be determined so as to satisfy the conditional expression (16).

When the upper limit of the conditional expression (16) is exceeded, the blur of the longitudinal chromatic aberration at the wide-angle end position becomes larger, and when the lower limit of the conditional expression (16) is exceeded toward the smaller side, the blur at the telephoto end position becomes larger, which is undesirable.

Generally, in a positive and negative 2 group zoom lens, when the diameter of aperture stop is fixed, the F number becomes larger as the magnification changes from the wide-angle end position to the telephoto end position, and the F number is greatly increased at the telephoto end position in a high variable-magnification zoom lens. When the F number is decreased, correction of the chromatic aberration or other aberrations becomes difficult. When the $F_W$ number at the wide-angle end position is increased, and the longitudinal chromatic aberration at the wide-angle end position can be increased, the longitudinal chromatic aberration and the F-number $F_T$ at the telephoto end position can be reduced.

When the variable magnification ratio is increased exceeding the conditional expression (17), the F number at the telephoto end position is increased excessively. Conversely, when the variable magnification ratio exceeds the lower limit of the conditional expression (17) and is decreased, $F_T$ can be reduced, however, correction of aberrations other than the chromatic aberration is difficult, and $F_W$ is increased, resulting in larger F number lens in the entire variable range, it is not desirable.

BRIEF DESCRIPTION OF THE DRAWINGS

FIGS. 2(a)-1 through 2(c)-3 are views showing aberrations in Example 1.

FIGS. 3(a)-1 through 3(c)-3 are views showing aberrations in Example 2.

FIGS. 5(a)-1 through 5(c)-3 are views of aberrations of Example 3.

FIGS. 6(a)-1 through 6(c)-3 are views of aberrations of Example 4.

FIGS. 7(a)-1 through 7(c)-3 are views of aberrations of Example 5.

FIGS. 8(a)-1 through 8(c)-3 are views of aberrations of Example 6.

FIGS. 9(a)-1 through 9(c)-3 are views of aberrations of Example 7.

DETAILED DESCRIPTION OF THE PREFERRED EMBODIMENT

Figure 1:
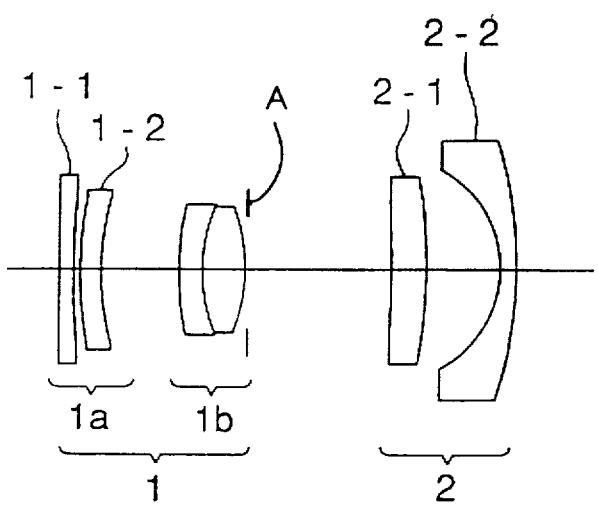
FIG. 1 is a sectional view of a lens of Examples 1 and 2.
Figures 1, 2A:
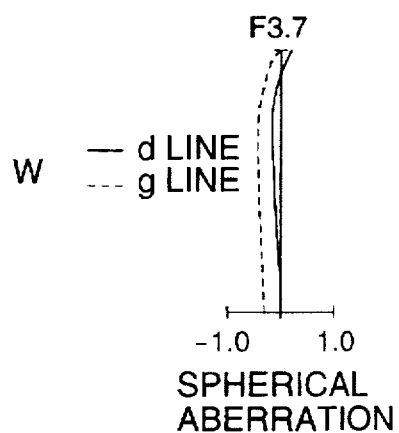
Figures 2, 2A:
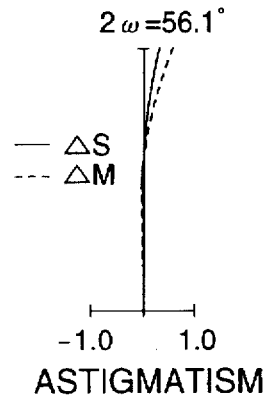
Figures 2, 2A, 3:
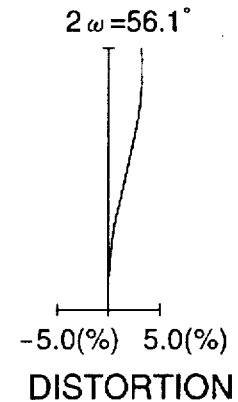
Figures 1, 2B:
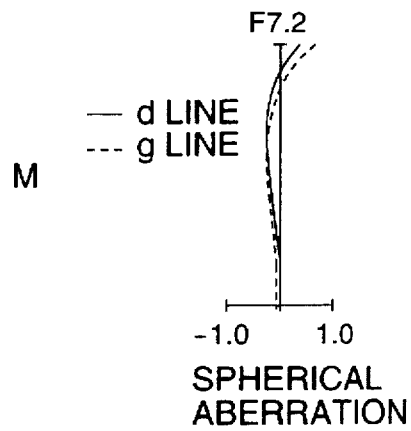
Figures 2, 2B:
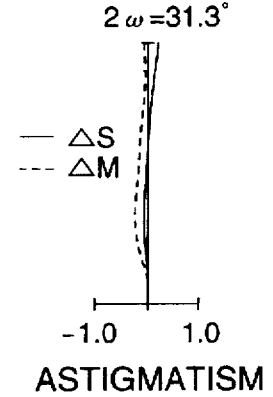
Figures 2, 2B, 3:
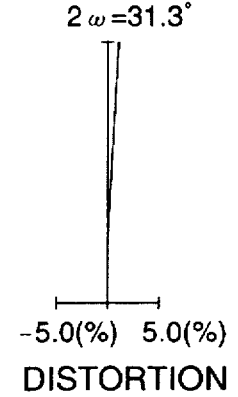
Figures 1, 2C:
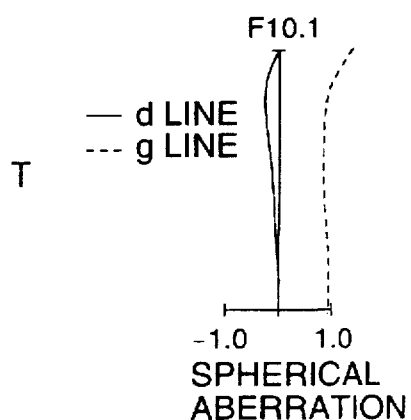
Figures 2, 2C:
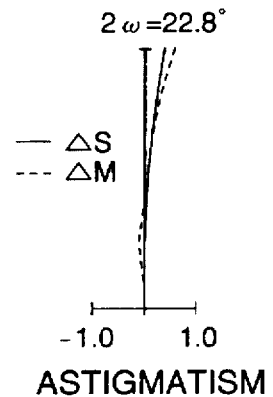
Figures 2, 2C, 3:
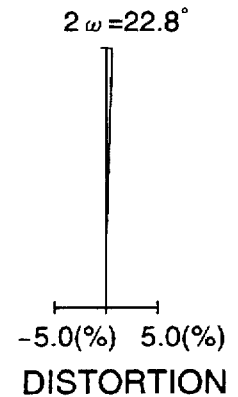

Referring to FIGS. 1 through 9(c)-3, examples of the present invention will be detailed below.

In a zoom lens in examples of the present invention, an aperture stop A is arranged on an image surface-side of the first lens group, and moves together with the first lens group when variable magnification is carried out. A 1-2 lens in the first lens group is formed of a diverging aspherical surface, and has essentially a negative refracting power including the effect of an aspherical surface. Accordingly, the zoom lens is structured so that influence due to temperature change can be canceled out between the 1-2 lens in the first lens group and the 2-1 lens in the second lens group.

Next, seven examples will be shown below. Values in the foregoing conditional expressions (1) through (17) corresponding to each example are shown in Table 1.

TABLE 1

| No** | Conditional expression | Example 1 | Example 2 | Example 3 | Example 4 | Example 5 | Example 6 | Example 7 |
|---|---|---|---|---|---|---|---|---|
| (1) | $f_T/f_W$ | 2.73 | 2.73 | 2.73 | 2.98 | 3.34 | 3.33 | 3.34 |
| (2) | $f_T/f_1$ | 3.65 | 3.69 | 3.64 | 4.01 | 4.31 | 4.18 | 4.19 |
| (3) | $f_1/|f_{1a}|$ | 0.23 | 0.21 | 0.33 | 0.33 | 0.38 | 0.35 | 0.35 |
| (4) | $D_1/f_W$ | 0.46 | 0.48 | 0.40 | 0.40 | 0.40 | 0.36 | 0.36 |
| (5) | $V_{1-1}$ | 23.8 | 25.4 | 23.8 | 23.8 | 23.8 | 23.8 | 23.8 |
| (6) | $f_1/|f_{1-2}|$ | 0.00 | 0.00 | 0.00 | 0.00 | 0.00 | 0.00 | 0.00 |
| (7) | $|f_2|/f_{2-1}$ | 0.08 | 0.09 | 0.23 | 0.21 | 0.32 | 0.50 | 0.46 |
| (8) | $F_W f_1/f_W$ | 2.76 | 2.73 | 2.77 | 2.75 | 2.71 | 3.59 | 4.46 |
| (9) | $2\omega_T$ | 22.8° | 22.8° | 22.9° | 21.0° | 18.8° | 18.7° | 18.8° |
| (10) | $\delta f_{BT}/f_T$ | 0.009 | 0.006 | 0.006 | 0.008 | 0.015 | 0.011 | 0.012 |
| (11) | $f_T/f_W$ | 2.73 | 2.73 | 2.73 | 2.98 | 3.34 | 3.33 | 3.34 |
| (12) | $\delta f_{BT}/\delta f_{BW}$ | −2.97 | −2.10 | −1.62 | −2.45 | −5.73 | −4.15 | −4.22 |
| (13) | $v_{1N}$ | 23.8 | 25.4 | 23.8 | 23.8 | 23.8 | 23.8 | 23.8 |
|  |  | 40.9 | 37.2 |  |  |  |  |  |
| (14) | $v_{1P}$ | 56.3 | 56.3 | 64.1 | 64.1 | 64.1 | 64.1 | 64.1 |
| (15) | $\delta f_{BT}$ | 0.92 | 0.61 | 0.63 | 0.98 | 1.93 | 1.48 | 1.50 |
| (16) | $\delta f_{BT} F_W/\delta f_{BW} F_T$ | −1.1 | −0.77 | −0.6 | −0.82 | −1.7 | −1.8 | −2.3 |
| (17) | $F_T f_W/F_W f_T$ | 1.0 | 1.0 | 1.0 | 1.0 | 1.0 | 0.69 | 0.55 |

**No. of conditional expression.

In the following symbols, f is the focal length (mm), $F_{NO}$ is the F number, $\omega$ is the half-field angle (°), $f_B$ is the back focal length (mm), r is the radius of curvature (mm), d is the interval between surfaces on the optical axis (mm), $n_d$ is the refractive index with respect to the d-line, and $v_d$ is Abbe's No.

The asterisk * expresses an aspherical surface, and in an orthogonal coordinate system in which the vertex of a surface is an original point and the direction of the optical axis is the X-axis, when the curvature of the vertex is C, the conic constant is K, and aspherical coefficients are $A_i$ (I=4, 6, 8 . . . ), the following arithmetical relationships are obtained.

$$X = \frac{ch^2}{1+\sqrt{1-(1+k)c^2h^2}} + A_4h^4 + A_6h^6 + A_8h^8 + \ldots$$

-continued $$h = \sqrt{Y^2 + Z^2}$$

In the aspherical coefficients, |D+J| expresses |×10$^J$|, and |D−J| expresses |×10$^{−J}$|.

EXAMPLE 1

When the wide-angle end position is W, the intermediate position is M, and the telephoto end position is T in Example 1, then, the focal length f of the entire system from the wide-angle end position to the telephoto end position, the F number $F_{NO}$, the field angle 2ω, and the back focal length $f_B$ are as follows:

|  | W | M | T |
|---|---|---|---|
| f | 39.2 | 76.6 | 106.9 |
| $F_{NO}$ | 3.7 | 7.2 | 10.1 |
| 2ω | 56.1 | 31.3 | 22.8 |
| $f_B$ | 7.4 | 38.1 | 63.0 |

Further, lens data in Example 1 are shown in Table 2, and aspherical coefficients are shown in Table 3.

TABLE 2

| Surface No. | r | d | $n_d$ | $v_d$ |
|---|---|---|---|---|
| 1 | ∞ | 1.20 | 1.84666 | 23.8 |
| 2 | 108.116 | 0.60 | | |
| 3* | 36.668 | 2.00 | 1.58300 | 30.0 |
| 4* | 35.932 | 7.80 | | |
| 5 | 40.523 | 2.20 | 1.80610 | 40.9 |
| 6 | 16.433 | 4.21 | 1.56883 | 56.3 |
| 7 | −16.446 | 14.65-5.90-3.30 | | |
| 8* | −213.813 | 3.40 | 1.49700 | 56.0 |
| 9* | −89.621 | 7.40 | | |
| 10 | −11.399 | 1.50 | 1.71300 | 53.9 |
| 11 | −44.635 | | | |

*Aspherical surface

TABLE 3

The 3rd surface

K = 3.21710D + 00
A4 = −5.81240D − 05
A6 = −5.71040D − 08
A8 = −1.69340D − 09
A10 = −8.80870D − 12

The 4-th surface

K = 2.43940D + 00
A4 = 3.27490D − 06
A6 = 3.69480D − 07
A8 = −2.15450D − 09

The 8-th surface

K = −4.23080D − 02
A4 = 3.28070D − 05
A6 = 3.19660D − 07
A8 = −2.91180D − 10
A10 = −5.84780D − 11
A12 = 7.90640D − 13

The 9-th surface

K = 5.97250D − 02
A4 = −1.37290D − 05
A6 = −7.78020D − 09

TABLE 3-continued

A8 = −1.88810D − 09
A10 = −2.31130D − 12
A12 = 2.03710D − 13

Further, a sectional view of a lens in Example 1 is shown in FIG. 1, and views of aberrations are shown in FIGS. 2(a)-1 through 2(c)-3.

Numeral 1 in FIG. 1 represents the first lens group, and is composed of the 1a lens group 1a and the 1b lens group 1b. The 1a lens group is composed of the 1-1 lens 1-1 and the 1-2 lens 1-2. Numeral 2 represents the second lens group, and is composed of the 2-1 lens 2-1 and the 2-2 lens 2-2.

FIGS. 2(a)-1 through 2(a)-3, FIGS. 2(b)-1 through 2(b)-3, and FIGS. 2(c)-1 through 2(c)-3 respectively show spherical aberrations, astigmatisms, and distortions at the wide-angle end position, medium position, and telephoto end position.

EXAMPLE 2

When the wide-angle end position is W, the intermediate position is M, and the telephoto end position is T in Example 2, then, the focal length f of the entire system from the wide-angle end position to the telephoto end position, the F number $F_{NO}$, the field angle 2ω, and the back focal length $f_B$ are as follows:

|  | W | M | T |
|---|---|---|---|
| f | 39.2 | 64.7 | 106.9 |
| $F_{NO}$ | 3.7 | 6.1 | 10.1 |
| 2ω | 56.1 | 36.5 | 22.8 |
| $f_B$ | 7.5 | 28.5 | 63.3 |

Further, lens data in Example 2 are shown in Table 4, and aspherical coefficients are shown in Table 5.

TABLE 4

| Surface No. | r | d | $n_d$ | $v_d$ |
|---|---|---|---|---|
| 1 | ∞ | 1.20 | 1.80518 | 25.4 |
| 2 | 116.889 | 0.60 | | |
| 3* | 22.993 | 1.95 | 1.58300 | 30.0 |
| 4* | 22.275 | 8.53 | | |
| 5 | 37.773 | 2.78 | 1.83400 | 37.2 |
| 6 | 16.795 | 3.68 | 1.56883 | 56.3 |
| 7 | −16.677 | 14.44-7.51-3.30 | | |
| 8* | −86.213 | 2.75 | 1.58300 | 30.0 |
| 9* | −56.911 | 7.10 | | |
| 10 | −11.166 | 1.50 | 1.72916 | 54.7 |
| 11 | −40.221 | | | |

*Aspherical surface

TABLE 5

The 3rd surface

K = 3.07140D + 00
A4 = −5.26760D − 05
A6 = −3.31380D − 07
A8 = −6.42840D − 09

The 4-th surface

K = 2.49250D + 00
A4 = 8.33150D − 06
A6 = 1.13550D − 07
A8 = −7.65920D − 09

TABLE 5-continued

The 8-th surface

K = 4.18730D − 02
A4 = 3.82210D − 05
A6 = 1.83000D − 07
A8 = −8.23270D − 10
A10 = 1.31280D − 11
A12 = 1.22240D − 13

The 9-th surface

K = 2.79920D − 02
A4 = −5.36360D − 06
A6 = −1.55670D − 07
A8 = −7.50810D − 11
A10 = 3.07280D − 12
A12 = 6.80310D − 14

Further, a sectional view of a lens in Example 2 is shown in FIG. 1, and views of aberrations are shown in Figs. 3(a)-1 through 3(c)-3.

FIGS. 3(a)-1 through 3(a)-3, FIGS. 3(b)-1 through 3(b)-3, and FIGS. 3(c)-1 through 3(c)-3 respectively show spherical aberrations, astigmatisms, and distortions at the wide-angle end position, medium position, and telephoto end position.

EXAMPLE 3

When the wide-angle end position is W, the intermediate position is M, and the telephoto end position is T in Example 3, then, the focal length f of the entire system from the wide-angle end position to the telephoto end position, the F number $F_{NO}$ from the wide-angle end position to the telephoto end position, the field angle 2ω, and the back focal length $f_B$ are as follows:

|  | W | M | T |
|---|---|---|---|
| f | 39.2 | 64.6 | 106.9 |
| $F_{NO}$ | 3.7 | 6.1 | 10.1 |
| 2ω | 56.3 | 36.9 | 22.9 |
| $f_B$ | 8.2 | 32.2 | 72.2 |

Further, lens data in Example 3 are shown in Table 6, and aspherical coefficients are shown in Table 7.

TABLE 6

| Surface No. | r | d | $n_d$ | $v_d$ |
|---|---|---|---|---|
| 1 | ∞ | 1.20 | 1.84666 | 23.8 |
| 2 | 79.248 | 1.20 | | |
| 3* | 21.137 | 2.00 | 1.58300 | 30.0 |
| 4* | 20.401 | 5.16 | | |
| 5 | 77.795 | 6.00 | 1.51633 | 64.1 |
| 6 | −14.407 | 17.49-9.30-4.30 | | |
| 7* | 35.549 | 3.40 | 1.49700 | 56.0 |
| 8* | −23.052 | 4.95 | | |
| 9 | −11.141 | 1.50 | 1.71300 | 53.9 |
| 10 | −38.735 | | | |

*Aspherical surface

TABLE 7

The 3rd surface

K = −9.11220D − 01
A4 = −5.66560D − 05
A6 = −9.70610D − 07
A8 = −4.62570D − 09

TABLE 7-continued

The 4-th surface

K = 3.03610D − 01
A4 = 1.13650D − 05
A6 = −7.08990D − 07
A8 = −2.19740D − 10

The 7-th surface

K = −9.33960D − 01
A4 = 5.19690D − 05
A6 = 1.35810D − 07
A8 = 1.62890D − 09
A10 = −2.25520D − 11
A12 = 1.86090D − 13

The 8-th surface

K = 3.51150D − 04
A4 = −2.77140D − 07
A6 = −2.80000D − 08
A8 = −4.83530D − 10
A10 = −4.95310D − 12
A12 = −3.52760D − 14

Figure 4:
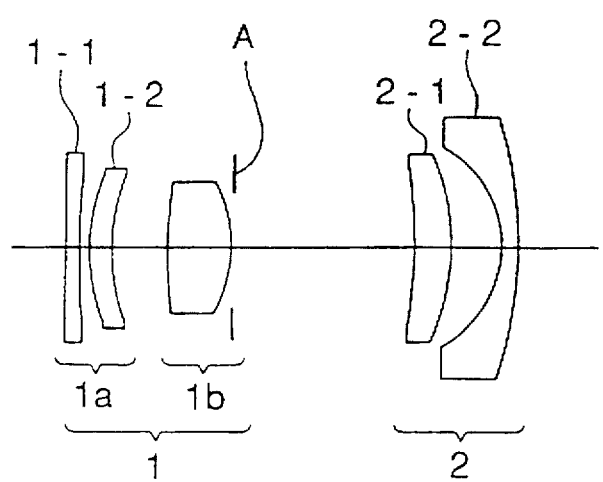
FIG. 4 is a sectional view of a lens in Examples 3 through 7.
Figures 1, 5A:
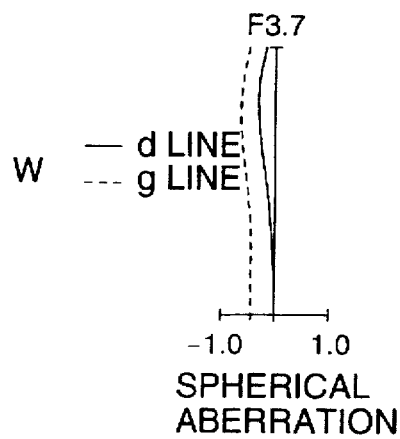
Figures 2, 5A:
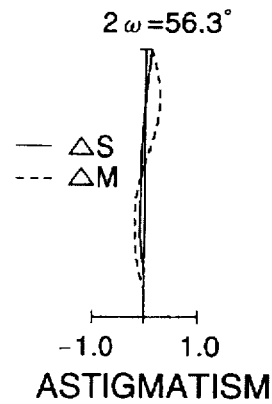
Figures 3, 5A:
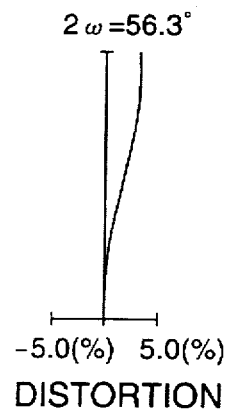
Figures 1, 5B:
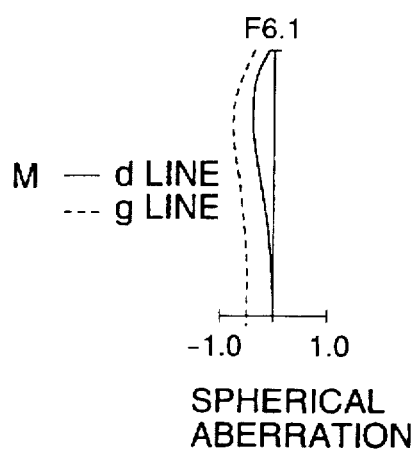
Figures 2, 5B:
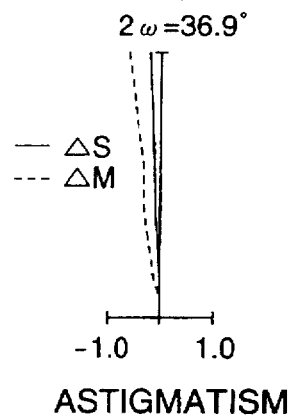
Figures 3, 5B:
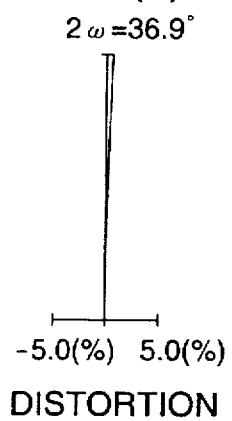
Figures 1, 5C:
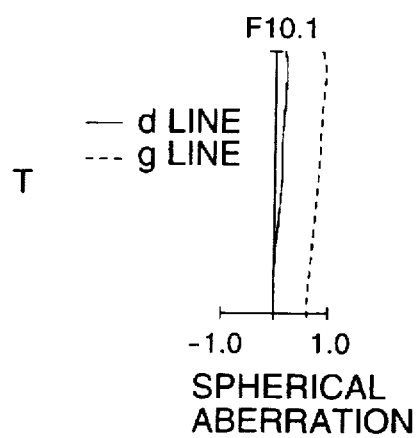
Figures 2, 5C:
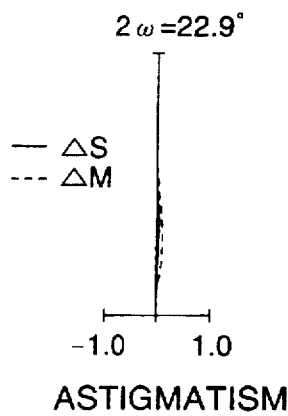
Figures 3, 5C:
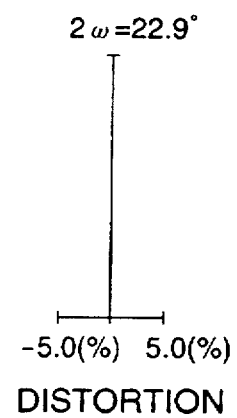
Figures 1, 6A:
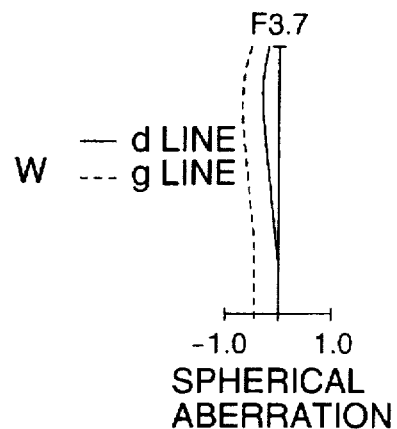
Figures 2, 6A:
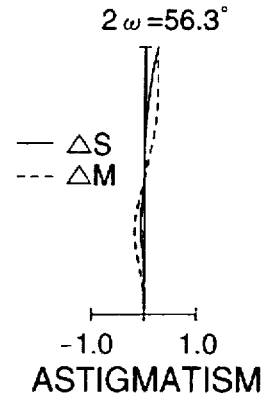
Figures 3, 6A:
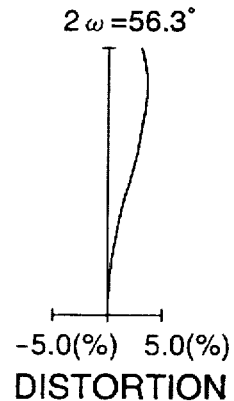
Figures 1, 6B:
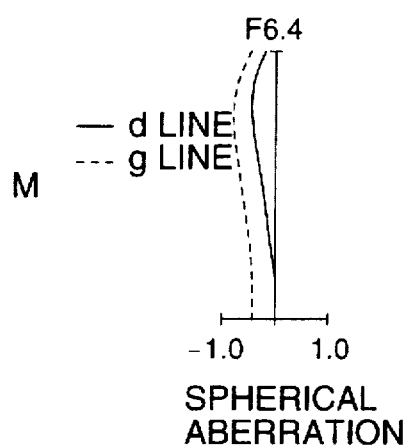
Figures 2, 6B:
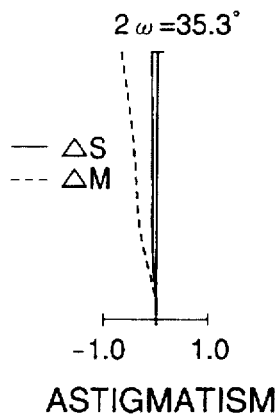
Figures 3, 6B:
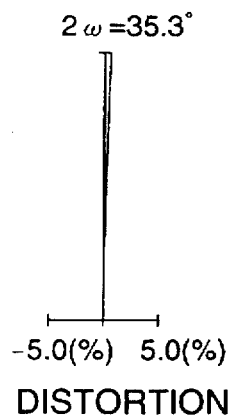
Figures 1, 6C:
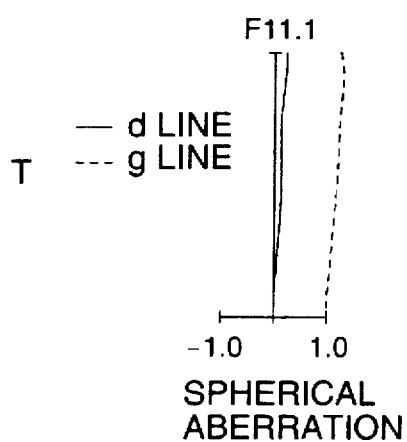
Figures 2, 6C:
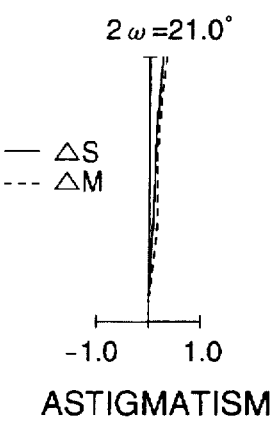
Figures 3, 6C:
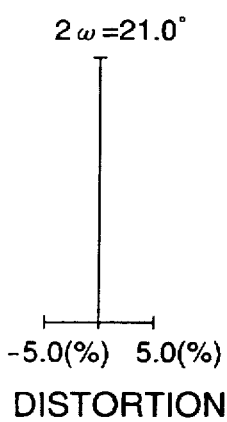
Figures 1, 7A:
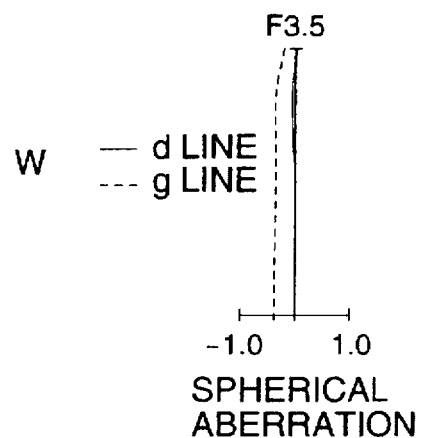
Figures 2, 7A:
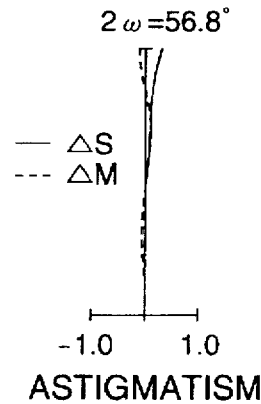
Figures 3, 7A:
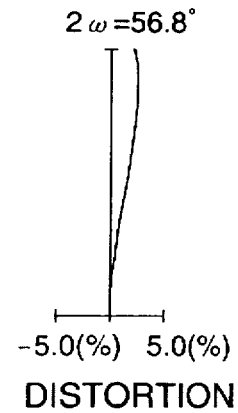
Figures 1, 7B:
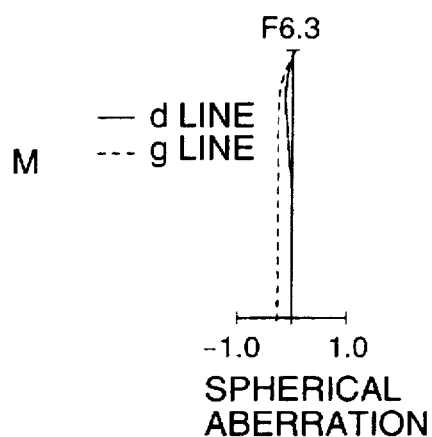
Figures 2, 7B:
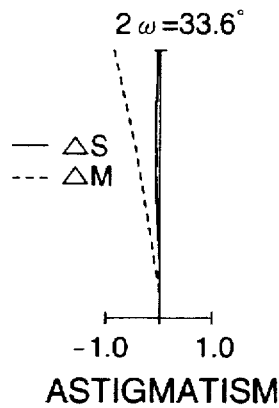
Figures 3, 7B:
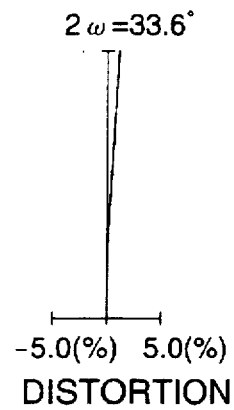
Figures 1, 7C:
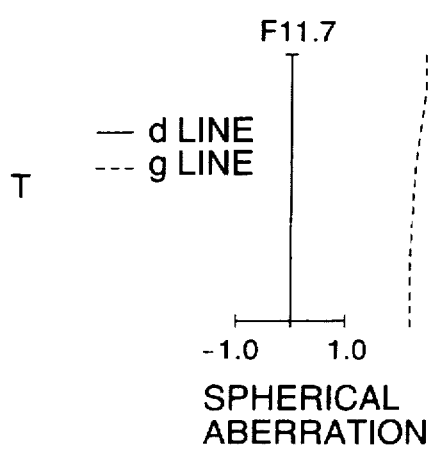
Figures 2, 7C:
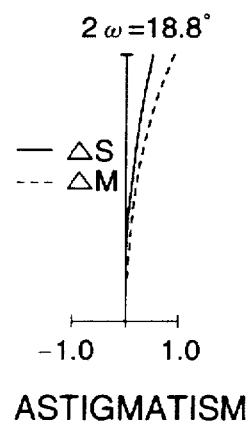
Figures 3, 7C:
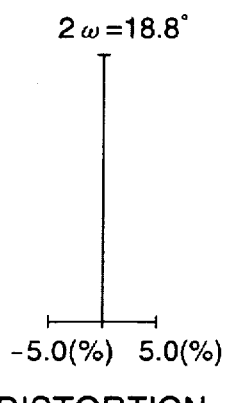
Figures 1, 9A:
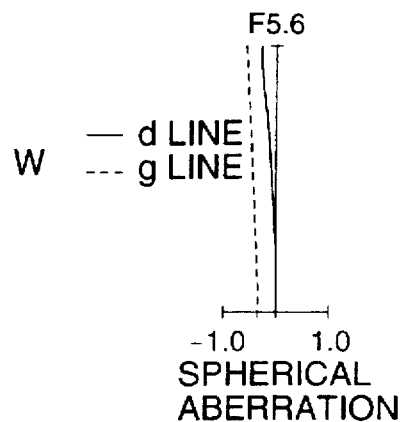
Figures 2, 9A:
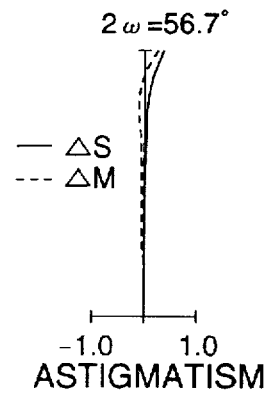
Figures 3, 9A:
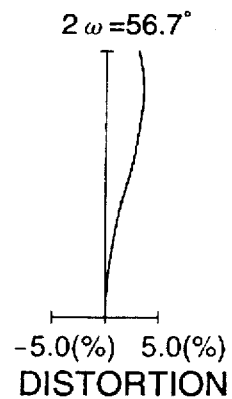
Figures 1, 9B:
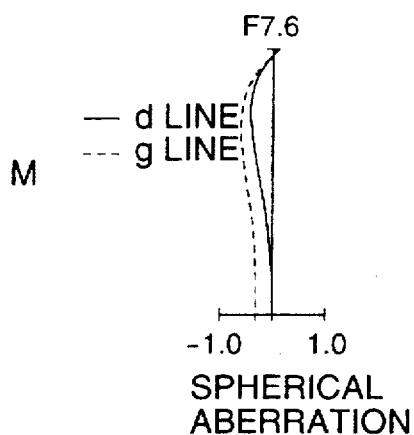
Figures 2, 9B:
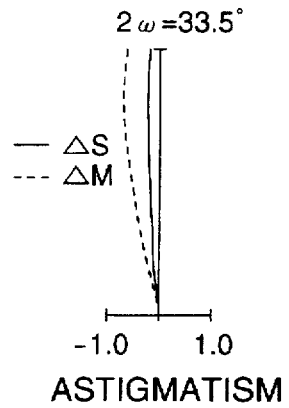
Figures 3, 9B:
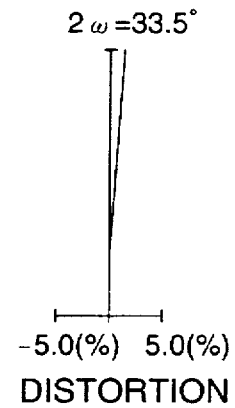
Figures 1, 9C:
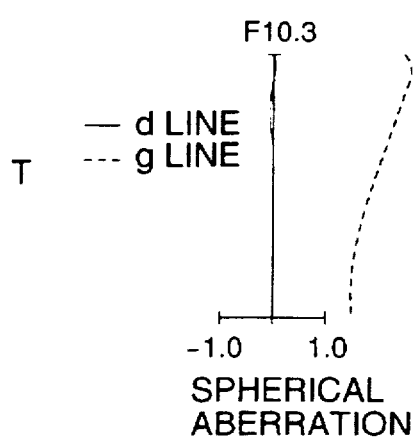
Figures 2, 9C:
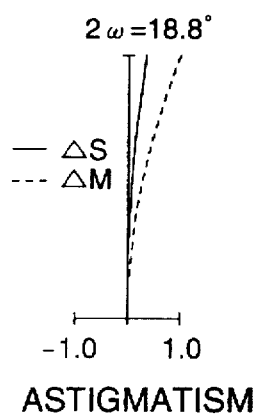
Figures 3, 9C:
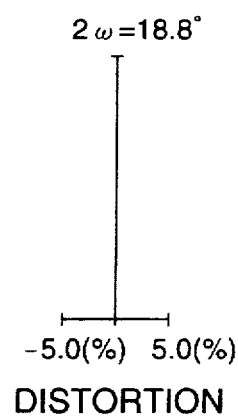

Further, a sectional view of a lens in Example 3 is shown in FIG. 4, and views of aberrations are shown in Figs. 5(a)-1 through 5(c)-3.

FIGS. 5(a)-1 through 5(a)-3, FIGS. 5(b)-1 through 5(b)-3, and FIGS. 5(c)-1 through 5(c)-3 respectively show spherical aberrations, astigmatisms, and distortions at the wide-angle end position, medium position, and telephoto end position.

EXAMPLE 4

When the wide-angle end position is W, the intermediate position is M, and the telephoto end position is T in Example 4, then, the focal length f of the entire system from the wide-angle end position to the telephoto end position, the F number $F_{NO}$ from the wide-angle end position to the telephoto end position, the field angle 2ω, and the back focal length $f_B$ are as follows:

|  | W | M | T |
|---|---|---|---|
| f | 39.2 | 67.7 | 117.0 |
| $F_{NO}$ | 3.7 | 6.4 | 11.1 |
| 2ω | 56.3 | 35.3 | 21.0 |
| $f_B$ | 8.0 | 34.0 | 79.0 |

Further, lens data in Example 4 are shown in Table 8, and aspherical coefficients are shown in Table 9.

TABLE 8

| Surface No. | r | d | $n_d$ | $v_d$ |
|---|---|---|---|---|
| 1 | ∞ | 1.20 | 1.84666 | 23.8 |
| 2 | 78.467 | 1.20 | | |
| 3* | 21.135 | 2.00 | 1.58300 | 30.0 |
| 4* | 20.398 | 5.17 | | |
| 5 | 77.874 | 6.00 | 1.51633 | 64.1 |
| 6 | −14.299 | 17.47-9.14-4.30 | | |
| 7* | −35.222 | 3.40 | 1.49700 | 56.0 |
| 8* | −23.353 | 4.97 | | |
| 9 | −11.039 | 1.50 | 1.71300 | 53.9 |
| 10 | −39.630 | | | |

*Aspherical surface

TABLE 9

The 3rd surface

K = −9.10620D − 01
A4 = −5.75320D − 05
A6 = −8.73310D − 07
A8 = −6.78350D − 09

The 4-th surface

K = 3.04230D − 01
A4 = 1.23430D − 05
A6 = −5.78690D − 07
A8 = −2.86160D − 09

The 7-th surface

K = −9.34190D − 01
A4 = 5.25320D − 05
A6 = 2.18260D − 07
A8 = −4.28410D − 10
A10 = −3.74120D − 11
A12 = 3.00560D − 13

The 8-th surface

K = 4.19890D − 04
A4 = −1.98710D − 06
A6 = 3.33770D − 08
A8 = −1.94320D − 09
A10 = −1.27640D − 11
A12 = −6.34040D − 14

Further, a sectional view of a lens in Example 4 is shown in FIG. 4, and views of aberrations are shown in FIGS. 6(a)-1 through 6(c)-3.

FIGS. 6(a)-1 through 6(a)-3, FIGS. 6(b)-1 through 6(b)-3, and FIGS. 6(c)-1 through 6(c)-3 respectively show spherical aberrations, astigmatisms, and distortions at the wide-angle end position, medium position, and telephoto end position.

EXAMPLE 5

When the wide-angle end position is W, the intermediate position is M, and the telephoto end position is T in Example 5, then, the focal length f of the entire system from the wide-angle end position to the telephoto end position, the F number $F_{NO}$ from the wide-angle end position to the telephoto end position, the field angle 2ω, and the back focal length $f_B$ are as follows:

|          | W    | M    | T     |
|----------|------|------|-------|
| f        | 39.2 | 71.0 | 130.8 |
| $F_{NO}$ | 3.5  | 6.3  | 11.7  |
| 2ω       | 56.8 | 33.6 | 18.8  |
| $f_B$    | 7.9  | 36.0 | 89.0  |

Further, lens data in Example 5 are shown in Table 10, and aspherical coefficients are shown in Table 11.

TABLE 10

| Surface No. | r       | d              | $n_d$   | $v_d$ |
|---|---|---|---|---|
| 1  | ∞       | 1.20           | 1.84666 | 23.8 |
| 2  | 69.444  | 1.20           |         |      |
| 3* | 21.126  | 2.00           | 1.58300 | 30.0 |
| 4* | 20.389  | 5.16           |         |      |
| 5  | 175.758 | 6.00           | 1.51633 | 64.1 |
| 6* | −13.342 | 18.86-9.55-4.30|         |      |
| 7* | −81.117 | 4.00           | 1.49700 | 56.0 |
| 8* | −28.070 | 4.68           |         |      |
| 9  | −12.468 | 1.50           | 1.71300 | 53.9 |
| 10 | −121.417|                |         |      |

*Aspherical surface

TABLE 11

The 3rd surface

K = −7.62874D − 01
A4 = −5.02401D − 05
A6 = −1.26168D − 06
A8 = −6.80593D − 09

The 4-th surface

K = 7.38967D − 01
A4 = 2.82990D − 05
A6 = −1.06145D − 06
A8 = 3.28344D − 10

The 6-th surface

K = −6.46758D − 02
A4 = 5.84131D − 06
A6 = −4.92749D − 08
A8 = −1.95099D − 09
A10 = 1.87140D − 11

The 7-th surface

K = 2.35393D + 01
A4 = 3.76129D − 05
A6 = 8.77387D − 08
A8 = −4.55474D − 09
A10 = 5.92565D − 11
A12 = −2.13319D − 13

The 8-th surface

K = 1.46780D + 00
A4 = −1.35610D − 05
A6 = 2.04168D − 07
A8 = −7.84493D − 09
A10 = 6.27480D − 11
A12 = −2.23734D − 13

Further, a sectional view of a lens in Example 5 is shown in FIG. 4, and views of aberrations are shown in FIGS. 7(a)-1 through 7(c)-3.

FIGS. 7(a)-1 through 7(a)-3, FIGS. 7(b)-1 through 7(b)-3, and FIGS. 7(c)-1 through 7(c)-3 respectively show spherical aberrations, astigmatisms, and distortions at the wide-angle end position, medium position, and telephoto end position.

EXAMPLE 6

When the wide-angle end position is W, the intermediate position is M, and the telephoto end position is T in Example 6, then, the focal length f of the entire system from the wide-angle end position to the telephoto end position, the F number $F_{NO}$ from the wide-angle end position to the telephoto end position, the field angle 2ω, and the back focal length $f_B$ are as follows:

|          | W    | M    | T     |
|----------|------|------|-------|
| f        | 39.3 | 71.0 | 130.8 |
| $F_{NO}$ | 4.5  | 6.8  | 10.3  |
| 2ω       | 56.4 | 33.5 | 18.7  |
| $f_B$    | 7.4  | 35.9 | 89.7  |

Further, lens data in Example 6 are shown in Table 12, and aspherical coefficients are shown in Table 13.

TABLE 12

| Surface No. | r | d | $n_d$ | $v_d$ |
|---|---|---|---|---|
| 1 | ∞ | 1.20 | 1.84666 | 23.8 |
| 2 | 79.072 | 1.20 | | |
| 3* | 21.126 | 2.00 | 1.58300 | 30.0 |
| 4* | 20.389 | 3.87 | | |
| 5 | 188.582 | 6.00 | 1.51633 | 64.1 |
| 6 | −13.697 | 20.00-9.97-4.30 | | |
| 7* | −88.106 | 4.50 | 1.49700 | 56.0 |
| 8* | −21.508 | 3.45 | | |
| 9 | −11.562 | 1.50 | 1.71300 | 53.9 |
| 10 | −128.347 | | | |

*Aspherical surface

TABLE 13

The 3rd surface

K = −4.00167D − 01
A4 = −1.22951D − 04
A6 = −2.25750D − 06
A8 = 3.06558D − 09

The 4-th surface

K = −3.29757D − 02
A4 = −4.28967D − 05
A6 = −2.26073D − 06
A8 = 1.53807D − 08

The 7-th surface

K = 7.25000D + 01
A4 = 4.23788D − 05
A6 = −2.59511D − 07
A8 = 1.48436D − 08
A10 = −1.96759D − 10
A12 = 8.66872D − 13

The 8-th surface

K = 6.40464D − 01
A4 = −2.26078D − 05
A6 = −1.26874D − 07
A8 = −1.29819D − 09
A10 = 2.18638D − 11
A12 = −4.30313D − 13

Further, a sectional view of a lens in Example 6 is shown in FIG. 4, and views of aberrations are shown in FIGS. 8(a)-1 through 8(c)-3.

FIGS. 8(a)-1 through 8(a)-3, FIGS. 8(b)-1 through 8(b)-3, and FIGS. 8(c)-1 through 8(c)-3 respectively show spherical aberrations, astigmatisms, and distortions at the wide-angle end position, medium position, and telephoto end position.

EXAMPLE 7

When the wide-angle end position is W, the intermediate position is M, and the telephoto end position is T in Example 6, then, a focal length f of the entire system from the wide-angle end position to the telephoto end position, the F number $F_{NO}$ from the wide-angle end position to the telephoto end position, the field angle 2ω, and the back focal length $f_B$ are as follows:

| | W | M | T |
|---|---|---|---|
| f | 39.2 | 71.0 | 130.8 |
| $F_{NO}$ | 5.6 | 7.6 | 10.3 |
| 2ω | 56.7 | 33.5 | 18.8 |
| $f_B$ | 7.4 | 36.1 | 90.0 |

Further, lens data in Example 7 are shown in Table 14, and aspherical coefficients are shown in Table 15.

TABLE 14

| Surface No. | r | d | $n_d$ | $v_d$ |
|---|---|---|---|---|
| 1 | ∞ | 1.20 | 1.84666 | 23.8 |
| 2 | 78.150 | 1.20 | | |
| 3* | 21.126 | 2.00 | 1.58300 | 30.0 |
| 4* | 20.389 | 3.68 | | |
| 5 | 344.712 | 6.00 | 1.51633 | 64.1 |
| 6 | −13.266 | 20.00-9.97-4.30 | | |
| 7* | −85.276 | 4.50 | 1.49700 | 56.0 |
| 8* | −21.488 | 3.51 | | |
| 9 | −11.432 | 1.50 | 1.71300 | 53.9 |
| 10 | −110.923 | | | |

*Aspherical surface

TABLE 15

The 3rd surface

K = −2.27565D − 01
A4 = −1.26466D − 04
A6 = −2.36079D − 06
A8 = 1.98548D − 09

The 4-th surface

K = 6.12064D − 01
A4 = −4.81361D − 05
A6 = −2.26370D − 06
A8 = 1.46456D − 08

The 7-th surface

K = 6.81003D + 01
A4 = 3.58861D − 05
A6 = −6.83295D − 08
A8 = 1.69893D − 08
A10 = −2.48942D − 10
A12 = 1.18656D − 12

The 8-th surface

K = 2.62657D − 01
A4 = −3.45920D − 05
A6 = −6.23553D − 08
A8 = 2.17873D − 10
A10 = 4.20139D − 13
A12 = −3.31265D − 13

Further, a sectional view of a lens in Example 7 is shown in FIG. 4, and views of aberrations are shown in FIGS. 9(a)-1 through 9(c)-3.

FIGS. 9(a)-1 through 9(a)-3, FIGS. 9(b)-1 through 9(b)-3, and FIGS. 9(c)-1 through 9(c)-3 respectively show spherical aberrations, astigmatisms, and distortions at the wide-angle end position, medium position, and telephoto end position.

As described above, according to the present invention, a high variable-magnification zoom lens, in which various aberrations are excellently corrected, can be obtained, with the intent of reducing the overall size and cost under a small number of lens elements.

What is claimed is:

1. A zoom lens comprising:

(a) a first lens group having a positive refracting power; and (b) a second lens group provided closer to an image side than said first lens group, having a negative refracting power, wherein a magnification chance is conducted by changing a distance between said first and the second lens groups, and wherein the zoom lens satisfies the following conditional expressions, $$2.5 < f_T/f_W$$

$$3.0<f_T/f_1<5.0$$

where $f_W$ represents a focal length at a wide-angle end position of an entire system of the zoom lens, $f_T$ represents a focal length at a telephoto end position of the entire system of the zoom lens, and $f_1$ represents a focal length of said first lens group, wherein said first lens group comprising, in the order named from an object side, (1) a 1a lens component having a negative refracting power, including a 1-1 lens element having a negative refracting power and a 1-2 lens element made of plastic, at least one surface of the 1-2 lens being an aspherical surface, and (2) a 1b lens component having a positive refracting power; and said second lens group comprising, in the order named from the object side, (1) a 2-1 lens element made of plastic having a positive refracting power, at least one surface of which is an aspherical surface, and (2) a 2-2 lens element having a negative refracting power.

2. The zoom lens of claim 1, wherein the zoom lens satisfies the following conditional expressions, $$0.18<f_1/f_{1a}<0.40$$

$$0.34<D_1/f_W<0.60$$

$$v_{1-1}<35$$

where $f_{1a}$ represents a focal length of said 1a lens component, $D_1$ represents an on-axis thickness of said first lens group, and $v_{1-1}$ represents an Abbe's number of said 1-1 lens element.

3. The zoom lens of claim 2, wherein the zoom lens satisfies the following conditional expressions, $$f_1/f_{1-2}|<0.1$$

$$0.04<|f_2|/f_{2-1}<0.60$$

where $f_{1-2}$ represents a focal length of said 1-2 lens element, $f_{2-1}$ represents a focal length of said 1-1 lens element, and $f_2$ represents a focal length of said second lens group.

4. A zoom lens comprising:

(a) a first lens group having a positive refracting power; and (b) a second lens group provided closer to an image side than said first lens group, having a negative refracting power, wherein a magnification change is conducted by changing a distance between said first and the second lens groups, and wherein the zoom lens satisfies the following conditional expressions, $$2.5<f_T/f_W$$

$$1.8<F_W f_1/f_W<3.0$$

where $f_W$ represents a focal length at a wide-angle end position of an entire system of the zoom lens, $f_T$ represents a focal length at a telephoto end position of the entire system of the zoom lens, $f_1$ represents a focal length of said first lens group, and $F_W$ represents an F-number at a wide-angle end position of the zoom lens.

5. The zoom lens of claim 4, wherein said first lens group comprises no more than three lenses which include a 1-1 lens element having a negative refracting power provided at a closest position to an object side, a 1b lens having a positive refracting power provided at a closest position to an image side, at least one surface of the 1b lens being an aspherical surface; and said second lens group comprises, in the order named from the object side, a 2-1 lens element having a positive refracting power and a convex surface facing the image side, and a 2-2 lens element having a negative refracting power.

6. The zoom lens of claim 5, wherein said first lens group comprises, in the order named from the object side:

a 1-1 lens element having a negative refracting power;

a 1-2 lens element, at least one surface of which has an aspherical surface; and said 1b lens.

7. A zoom lens comprising:

(a) a first lens group having a positive refracting power; and (b) a second lens group provided closer to an image side than said first lens group, having a negative refracting power, wherein a magnification change is conducted by changing a distance between said first and the second lens groups, and wherein the zoom lens satisfies the following conditional expressions, $$2.5<f_T/f_W$$

$$\omega_T<23°$$

$$0.005<\delta f_{BT}/f_T<0.020$$

where $f_W$ represents a focal length at a wide-angle end position of an entire system of the zoom lens, $f_T$ represents a focal length at a telephoto end position of the entire system of the zoom lens, $\omega_T$ represents a half-field angle at the telephoto end position, and $\delta f_{BT}$ represents a longitudinal chromatic aberration on a g-line with respect to a d-line at the telephoto end position.

8. The zoom lens of claim 7, wherein said first lens group comprises no more than three lenses which include a 1-1 lens element having a negative refracting power provided on a closest side to an object, a 1b lens having a positive refracting power provided at a closest position to an image side, at least one surface of the 1b lens having an aspherical surface.

9. The zoom lens of claim 8, wherein the zoom lens satisfies the following conditional expressions, $$2.8<f_T/f_W$$

$$2\omega_T<22°$$

$$0.007<\delta f_{BT}/f_T<0.017$$

where $f_W$ represents a focal length at a wide-angle end position of an entire system of the zoom lens, $f_T$ represents a focal length at a telephoto end position of the entire system of the zoom lens, $\omega_T$ represents a half-field angle at the telephoto end position, and $\delta f_{BT}$ represents a longitudinal chromatic aberration on a g-line with respect to a d-line at the telephoto end position.

21

10. A zoom lens comprising:

(a) a first lens group having a positive refracting power; and (b) a second lens group provided closer to an image side than said first lens group, having a negative refracting power, wherein a magnification change is conducted by changing a distance between said first and the second lens groups, and wherein the zoom lens satisfies the following conditional expressions, $$2.5 < f_T/f_W$$

$$-6.0 < \delta f_{BT}/\delta f_{BW} < 2.4$$

where $f_W$ represents a focal length at a wide-angle end position of an entire system of the zoom lens, $f_T$ represents a focal length at a telephoto end position of the entire system of the zoom lens, $\delta f_{BT}$ represents a longitudinal chromatic aberration on a g-line with respect to a d-line at the telephoto end position, and $\delta f_{BW}$ represents a longitudinal chromatic aberration on a g-line with respect to a d-line at the wide-angle end position, wherein said first lens group comprises not more than three lenses which include a 1-1 lens element having a negative refracting power provided at a closest position to an object side, a 1b lens having a positive refracting power provided at a closest position to the image side, at least one surface of the 1b lens having an aspherical surface.

11. The zoom lens of claim 10, wherein the zoom lens satisfies the following conditional expressions, $$3.2 < f_T/f_W < 3.5$$

$$-5.8 < \delta f_{BT}/\delta f_{BW} < -4.$$

12. The zoom lens of claim 10, wherein the zoom lens satisfies the following conditional expressions, $$\nu_{1N} < 35$$

$$\nu_{1P} < 50$$

where $\nu_{1N}$ represents an Abbe's number of a negative lens in said first lens group, and $\nu_{1P}$ represents an Abbe's number of a positive lens in said first lens group.

13. The zoom lens of claim 10, wherein said second lens group comprising, in the order named from the object side, (1) a 2-1 lens element having a positive refracting power, at least one surface of which is an aspherical surface, and (2) a 2-2 lens element having a negative refracting power.

14. A zoom lens comprising:

(a) a first lens group having a positive refracting power; and (b) a second lens group provided closer to an image side than said first lens group, having a negative refracting power, wherein a magnification change is conducted by changing a distance between said first and the second lens groups,

22 and wherein the zoom lens satisfies the following conditional expressions, $$2.5 < f_T/f_W$$

$$0 < \delta f_{BT}$$

$$-3.0 < (\delta f_{BT}/\delta f_{BW})/(F_T/F_W) < -1.2$$

where $f_W$ represents a focal length at a wide-angle end position of an entire system of the zoom lens, $f_T$ represents a focal length at a telephoto end position of the entire system of the zoom lens, $\delta f_{BT}$ represents a longitudinal chromatic aberration on a g-line with respect to a d-line at the telephoto end position, $\delta f_{BW}$ represents a longitudinal chromatic aberration on a g-line with respect to a d-line at the wide end, $F_W$ represents an F-number at the wide-angle end position, and $F_T$ represents an F-number at the telephoto end position, wherein a diameter of an aperture stop is adjustable according to a zooming position, and the zoom lens satisfies the following conditional expression, $$0.5 \times (f_T/f_W) < F_T/F_W < f_T/f_W.$$

15. A zoom lens comprising:

(a) a first lens group having a positive refracting power; and (b) a second lens group provided closer to an image side than said first lens group, having a negative refracting power, wherein a magnification change is conducted by changing a distance between said first and the second lens groups, and wherein the zoom lens satisfies the following conditional expressions, $$2.5 < f_T/f_W$$

$$0 < \delta f_{BT}$$

$$-3.0 < (\delta f_{BT}/\delta f_{BW})/(F_T/F_W) < -1.2$$

where $f_W$ represents a focal length at a wide-angle end position of an entire system of the zoom lens, $f_T$ represents a focal length at a telephoto end position of the entire system of the zoom lens, $\delta f_{BT}$ represents a longitudinal chromatic aberration on a g-line with respect to a d-line at the telephoto end position, $\delta f_{BW}$ represents a longitudinal chromatic aberration on a g-line with respect to a d-line at the wide end, $F_W$ represents an F-number at the wide-angle end Position, and $F_T$ represents an F-number at the telephoto end position, wherein said first lens group comprises no more than three lenses which include a 1-1 lens element having a negative refracting power provided at a closest position to an object side, a 1b lens having a positive refracting power provided at a closest position to the image side; and said second lens group comprises, in the order named from the object side, a 2-1 lens element having a positive refracting power, at least one surface of the 2-1 lens having an aspherical surface, and a 2-2 lens element having a negative refracting power.

* * * * *